United States Patent [19]

Landry et al.

[11] Patent Number: 5,250,626
[45] Date of Patent: Oct. 5, 1993

[54] MISCIBLE BLENDS OF POLYPHOSPHAZENES AND ACIDIC FUNCTIONAL POLYMERS

[75] Inventors: Christine J. T. Landry, Honeoye Falls; Wayne T. Ferrar, Fairport; David M. Teegarden, Rochester, all of N.Y.

[73] Assignee: Eastman Kodak Company, Rochester, N.Y.

[21] Appl. No.: 610,673

[22] Filed: Nov. 8, 1990

[51] Int. Cl.⁵ .................... C08G 79/02; C08L 85/02
[52] U.S. Cl. .................................... 525/188; 528/399
[58] Field of Search .......................... 525/188, 399

[56] References Cited

U.S. PATENT DOCUMENTS

| | | | |
|---|---|---|---|
| 4,000,166 | 12/1976 | Witner et al. | 260/37 |
| 4,055,520 | 10/1977 | Dieck et al. | 260/2.5 R |
| 4,061,606 | 12/1977 | Dieck et al. | 260/2.5 R |
| 4,073,824 | 2/1978 | Dieck et al. | 260/823 |
| 4,079,035 | 3/1978 | Brackenridge | 260/45.9 NP |
| 4,559,117 | 12/1985 | Bohm | 204/159.13 |
| 4,656,246 | 4/1987 | Chang et al. | 528/399 |
| 4,997,881 | 3/1991 | Patel et al. | 525/198 |
| 5,010,128 | 4/1991 | Coltrain et al. | 524/493 |

OTHER PUBLICATIONS

Allcock et al., *Macromolecules*, vol. 19, No. 6 (1986) pp. 1508-1512.
Abraham et al., J. Electrochem. Soc., Jan. 1987. pp. 3576-3581.
Blonsky, P. M. et al., Solid State Ionics 18 & 19 (1986) pp. 258-264.
Olabisi, Olagoke, Lloyd M. Robeson, Montgomery T. Shaw. "Polymer-Polymer Miscibility", Academic Press, New York (1979). pp. 243-245.
Moskala, E. J., D. F. Varnell, M. M. Coleman. "Concerning the miscibility of poly (vinyl phenol) blends-F Ti.r. study" *Polymer. V. 26, Feb. 1985. pp. 228-234.*
J. Applied Polymer Science, vol. 20, pp. 473 (1976) Connelly et al.
Macromolecules, vol. 1, pp. 566 (1979) Beres et al.

*Primary Examiner*—James J. Seidleck
*Assistant Examiner*—Thomas Hamilton, III
*Attorney, Agent, or Firm*—Doreen M. Wells

[57] ABSTRACT

There are disclosed miscible blends of etheric polyphosphazenes and polymers bearing acidic functional groups such as poly(vinylphenol) or polymers containing acrylic acid.

8 Claims, 1 Drawing Sheet

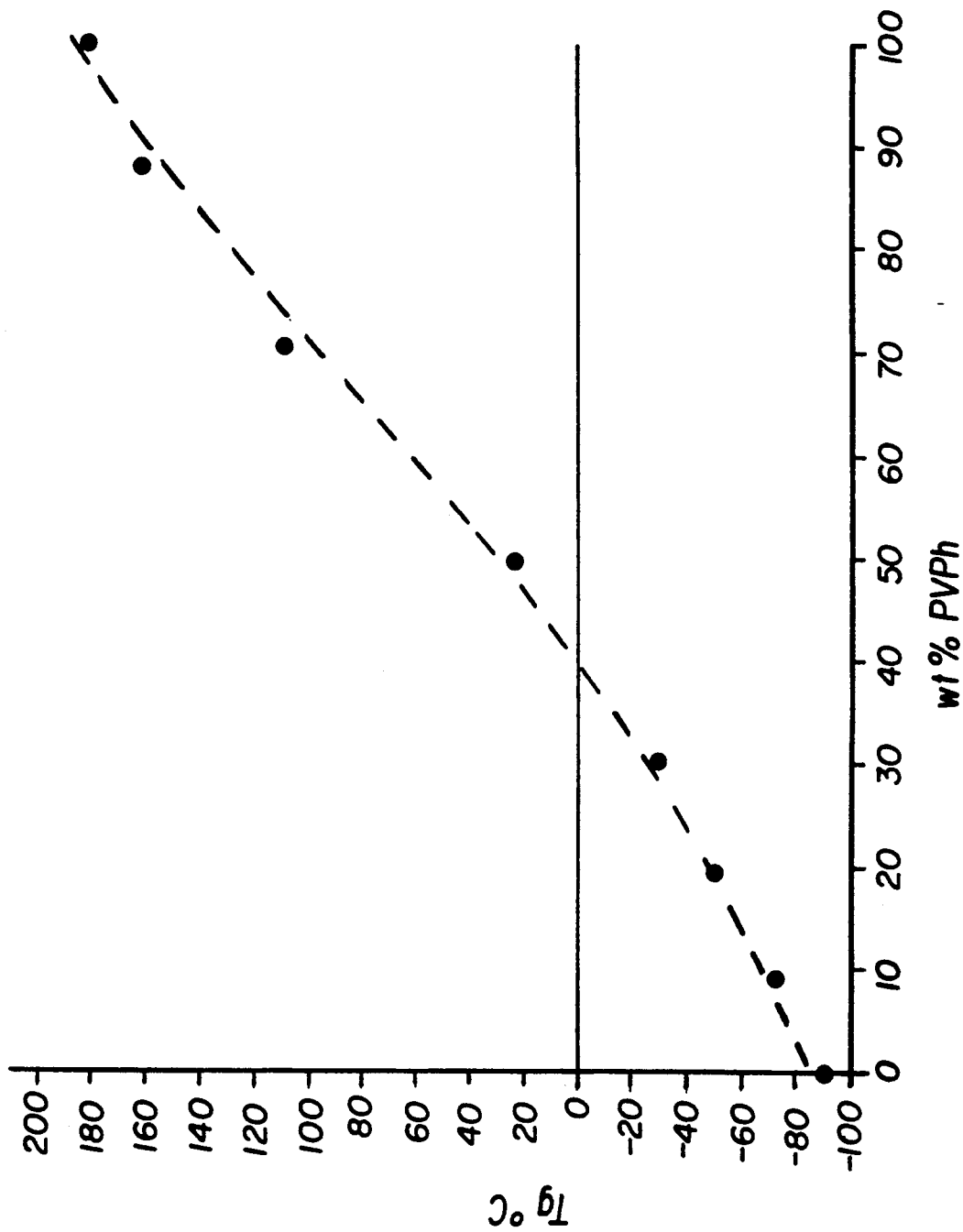

MISCIBLE BLENDS OF POLYPHOSPHAZENES AND ACIDIC FUNCTIONAL POLYMERS

FIELD OF THE INVENTION

This invention relates to the field of polymer blends. More specifically, this invention relates to miscible blends of polyphosphazenes with acidic functional polymers.

BACKGROUND OF THE INVENTION

The general class of phosphazene polymers has been known for some time. Etheric polyphosphazenes, i.e., polyphosphazenes containing monoethoxy and/or polyetheroxy substituents have been found to be useful in various applications including, for example, membranes, polymeric electrolytes, biomedical materials, moldings and coatings. Etheric polyphosphazenes have been described by Allcock et al, U.S. Pat. No. 3,370,020; Frank-Filipasio et al, U.S. Pat. No. 3,986,882; Schulz et al, U.S. Pat. No. 4,258,173; Nakacho et al, U.S. Pat. No. 4,840,856; Allcock et al, Macromolecules, Vol. 19, No. 6, 1986, pp. 1508-1512; Tonge et al, J. Electrochem. Soc., January 1987, pp. 269-270; and Abraham et al., J. Electrochem. Soc., December 1989, pp. 3576-3581.

Non-miscible blends of various polyphosphazenes are known and have been described, for example, by Dieck et al, U.S. Pat. No. 4,073,825, Witmer et al, U.S. Pat. No. 4,000,166, Bohm, U.S. Pat. No. 4,559,117 (phosphazene-siloxane blends); Dieck et al, U.S. Pat. No. 4,061,606 (phosphazene-organic polymer blends); Brackenridge, U.S. Pat. No. 4,079,035 (aryloxy phosphazenes as flame retardants for organic polymers) and Tatemoto, U.S. Pat. No. 4,266,698 (crosslinkable blends of iodine containing fluoroelastomers and fluorophosphazenes). Such physical blends are not transparent and exhibit two glass transition temperatures.

Miscible blends within the same class of polyphosphazenes have been described by Connelly et al, J. Applied Polymer Science, 1976, 20, 473 (poly(fluoroalkyloxyphosphazenes)) and by Dieck et al, U.S. Pat. No. 4,055,520, U.S. Pat. No. 4,073,824, J. Applied Polymer Science, 1976, 20, 473 and Beres et al, Macromolecules, 1979, 12, 566 (poly(aryloxy phosphazenes)). However, these systems are limited to mixtures within the same family of poly(phosphazenes), i.e., poly(fluoroalkoxyphosphazenes) with other poly(fluoroalkoxyphosphazenes) or poly(aryloxyphosphazenes) with other poly(aryloxyphosphazenes).

"Miscibility" refers to blends or compositions of polymers in which the component polymers do not undergo phase separation, thus helping to avoid stratification of the components during or after processing. "Miscibility" is a great significance for an admixture of different resins because it ensures homogeneity, and a unity of properties, which greatly facilitates subsequent processing and use of the composition. For example, such blends tend to be transparent, possess a single glass transition temperature, and exhibit other characteristics of a single material. Incompatible physical blends separate into phases containing predominantly their own separate components, and thus may be considered to be immiscible. This characteristic, combined with the often low physical attractive forces across the phase boundaries, usually causes immiscible blend systems to be opaque and suffer from delamination at the phase boundaries, thus preventing the preparation of polymer blends useful for a number of applications.

It has been desired to provide molecularly miscible blends of polyphosphazenes with other classes of polymers. Even though a variety of polyphosphazenes and polyphosphazene-containing blends have been known, prior to this invention applicants were not aware of any miscible blends containing polyphosphazenes with other classes of polymers.

SUMMARY OF INVENTION

We have discovered that etheric polyphosphazenes form molecularly miscible blends with certain functional polymers.

More specifically, in accordance with this invention, there is provided a molecularly miscible blend of polymers consisting of (a) an etheric polyphosphazene comprising recurring units represented by the structural formula:

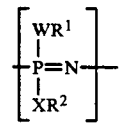

wherein $R^1$ and $R^2$ each independently represents the formula $-(R^3-O)_n-R^4$ where n is 0 to 50 and n is 1 or more in at least half of the total substituents, $R^3$ is randomly alkyl having from 2 to 4 carbon atoms between oxygen atoms, $R^4$ is alkyl, alkylaryl, alkenyl, haloalkyl, aryl, substituted aromatic, aminoalkyl or thioalkyl, W and X each independently represents

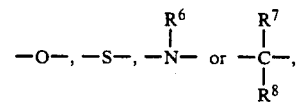

$R^6$, $R^7$ and $R^8$ each independently represents H, alkyl, alkenyl, alkynyl, haloalkyl, haloalkenyl, haloalkynyl, phenyl, substituted aromatic, aminoalkyl or thioalkyl, and (b) a polymer bearing acidic functional groups, preferably a polymer comprising recurring units at least 5% of which are represented by the structural formula:

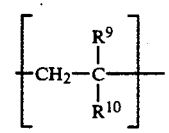

wherein $R^9$ represents H or $CH_3$ and $R^{10}$ represents $CO_2H$, $C_6H_4CO_2H$, $C_6H_4OH$, $C_6H_4SO_3H$, or $C_6H_4C(CF_3)_2OH$.

It is an advantageous feature of this invention that the above-described blends exhibit one glass transition temperature. It is another advantageous feature of this invention that the above-described non-crystalline blends exhibit excellent optical transparency.

Other advantageous features of this invention will become readily apparent upon reference to the following description of preferred embodiments when read in light of the accompanying drawing.

BRIEF DESCRIPTION OF THE DRAWINGS

The sole FIGURE is a plot of the glass transition temperature for blends in accordance with this invention of poly(vinylphenol) and poly(bis(2-(2-methoxyethoxy)ethoxy)phosphazene) as a function of the weight percent poly(vinylphenol).

DESCRIPTION OF THE PREFERRED EMBODIMENTS

It has been found in accordance with the instant invention that the desired miscible blends can be obtained by blending together (a) an etheric polyphosphazene and (b) a polymer bearing acidic functional groups such as described above and wherein components (a) and (b) are blended in varying proportions by weight.

The term "acidic functional group" describes a functional group bearing a proton sufficiently acidic as to be capable of undergoing hydrogen bonding with polymers containing basic sites. Examples of monomers which could be used to make polymers containing acidic functional groups as defined above include but are not limited to:
acrylic acid
methacrylic acid
maleic acid
citriconic acid
1-propene-1,2,3-tricarboxylic acid
α-chloroacrylic acid
fumaric acid
chlorofumaric acid
itaconic acid
vinylbenzoic acid
phenolic polymers (e.g., phenol formaldehyde resins)
vinylphenol
N-(hydroxyphenyl)acrylamide
N-(hydroxyphenyl)methacrylamide
hydroxyphenyl acrylate
hydroxyphenyl methacrylate
3-sulfopropylmethacrylate
2-acrylamido-2-methylpropane sulfonic acid
vinyl alcohol
vinyl chloride.
Also included in the above list are polymers that contain precursors to, or derivatives of, acidic functional groups which by virtue of their instability, high reactivity, or tendency to hydrolyze, usually contain some concentration of an acidic functional group or would contain some concentration of an acidic functional group on blending with a sample of an etheric polyphosphazene.

"Miscible blends" are defined herein as blends which behave as homogeneous material, even though they can be separated by conventional techniques during other forms of physical testing. More specifically, the miscible blends of this invention either present one glass transition temperature ($T_g$) as measured by Differential Scanning Colorimetry (DSC) or, if non-crystalline, are optically transparent, i.e., any phase-separated structure present in the blend will be smaller than 1000 Å. Large scale phase separation does not occur with the miscible blends of this invention.

The polyphosphazenes useful in the practice of this invention are etheric polyphosphazenes preferably represented by structural formula I recited in the summary above.

In formula I, $R^1$ and $R^2$ each independently represents $+R^3-O+_n-R^4$ where n is 0 to 50 with the proviso that n is 1 or more in at least half of the total substituents. Especially preferred values of n are from 2 to 18.

In the units $+R^3-O+$, each $R^3$ is randomly straight or branched chain alkyl, preferably having from 2 to 4 carbon atoms between oxygen atoms and preferably 2 carbon atoms in a chain between oxygen atoms. By "randomly straight or branched chain alkyl having from 2 to 4 carbon atoms" it is meant that the $R^3$ in each repeating ($R^3-O$) unit present may be the same or different provided that each $R^3$ contains from 2 to 4 carbon atoms. In other words, there may be from 2 to 4 carbon atoms between oxygen atoms. For example, where n=3, $R^1$ could be $-CH_2CH_2-O-CHCH_3CHCH_3-O-CH_2CHCH_3-O-R^4$. Specific examples of $R^3$ include ethylene, n-propylene, isopropylene and n-butylene.

$R^4$ represents alkyl, alkenyl, alkynyl, haloalkyl, haloalkenyl, haloalkenyl, phenyl, substituted aromatic, aminoalkyl, and thioalkyl typically of from 1 to 18 carbon atoms. $R^4$ preferably is alkyl, alkenyl, haloalkyl or aromatic of from 1 to 18 carbon atoms. Suitable as $R^4$ are substituted alkyl, alkenyl or aromatic groups containing from 1 to 18 carbon atoms. Examples of substituents include halogen such as F or Cl, amino groups such as $NH_2$, $NHCH_3$, or $N(CH_3)_2$ and thio-containing groups, such as alkylthio (e.g., methylthio, ethylthio and the like) or sulfonate. A preferred substituted $R^4$ group is a terminally halogen substituted alkyl group such as perfluoroalkyl. Examples of $R^4$ include $-CH_3$, $-CH_2CH_3$, $-CH_2CF_3$, $-CH_2CCl_3$, $-(CH_2)_5CH_3$, $-(CH_2)_4-CH=CH-CH_3$, $-CH_2-O-CH_3$ and $(C_6H_4)-(C_8H_{17})$.

W and X each independently represents a linking group preferably selected from the group consisting of

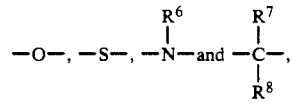

wherein $R^6$, $R^7$ and $R^8$ each independently represents H, alkyl, alkenyl, alkynyl, haloalkyl, haloalkenyl, haloalkynyl, phenyl, substituted aromatic, aminoalkyl or thioalkyl, typically containing from 1 to 18 carbon atoms. $R^6$, $R^7$ and $R^8$ preferably represent H, alkyl or alkenyl of from 1 to 8 carbon atoms. Substituted alkyl and alkenyl groups of from 1 to 18 carbon atoms are also useful. Examples of substituents include halogen such as F or Cl, amino groups such as $NH_2$, $NHCH_3$, or $N(CH_3)_2$, and thio-containing groups, such as alkylthio, (e.g., methylthio, ethylthio, and the like) or sulfonate.

The functional polymers usable in the miscible blends of this invention preferably have the structural formula II above. $R^9$ in formula II represents H or $CH_3$. $R^{10}$ in formula II represents $CO_2H$, $C_6H_4CO_2H$, $C_6H_4OH$, $C_6H_4SO_3H$, $C_6H_4C(CF_3)_2OH$. Other polymers usable herein include copolymers of the above functional polymers with other vinyl monomers such as styrene, ethylene or acrylates wherein at least approximately 5% of the repeating units are the functional monomers. It is preferred that at least approximately 10% of the repeating units are the functional monomer.

Preferred blends are based on 100 parts of a combined mixture of (a) and (b) prepared from about 10 to 90 parts of (a) and correspondingly, from about 90 to 10 parts of (b).

The miscible blends of this invention can be readily prepared by mixing a solution containing about 1 to 99 parts by weight of a polyphosphazene having the structure of (a) with a solution containing about 99 to 1 parts by weight of a polymer bearing acidic functional groups.

The miscible blends of the invention find particular utility as gas or ionic transport membranes and/or polymeric electrolytes upon the addition of appropriate salts. In addition, the polyphosphazene contributes useful properties such as flame retardation and permanent plasticization to the organic polymer. On the other hand, the polymers bearing acidic functional groups generally have a higher $T_g$ than the poly(phosphazene) and so adds to the poly(phosphazene) mechanical stability, increased hardness, reduced tackiness and increased heat distortion temperature.

While applicants do not wish to be bound by theoretical considerations, it is believed that miscibility may be conferred upon the blends of this invention by hydrogen bonding between the oxygen atoms on the side chain of the polyphosphazene and the acidic group on the functional polymers.

The invention is further illustrated by the Examples which follow.

EXAMPLE 1

MEEP/poly(vinylphenol) blends

Solution 1 was prepared by dissolving MEEP (poly[bis(2-(2-methoxyethoxy)ethoxy)phosphazene] of molecular weight $M_w = 3.6$ million g/mol, intrinsic viscosity of 3.3) at a 5 wt % concentration in tetrahydrofuran (THF). Solution 2 was prepared by dissolving PVPh (poly(vinylphenol)) of molecular weight $M_w = 68,000$ g/mol (in polystyrene equivalents) at a concentration of 5 wt % in THF. Solutions 1 and 2 were mixed in proportions of 1/9, 2/8, 3/7, 5/5, 7/3, 8/2, and 9/1. Each aliquot was solution cast onto an inert substrate and the solvent removed by evaporation. All of the resulting films were optically transparent, and the blends showed a single $T_g$ as measured by DSC which is a function of composition as illustrated in FIG. 1. Evidence of substantial hydrogen bonding in these blends was also observed by FTIR from the shift in the PVPh hydroxyl absorbance band to lower wavenumbers. All of the above observations demonstrate that MEEP and PVPh are miscible polymers.

EXAMPLE 2

MEEEP/PVPh blends

MEEEP (poly[bis(methoxyethoxyethoxyethoxy)phosphazene]) was dissolved at a 5 wt % concentration in methyl ethyl ketone (MEK) (solution 1). PVPh was dissolved at a 5 wt % concentration in MEK (solution 2). Solutions 1 and 2 were mixed in varying proportions and solution cast onto inert substrates. The solvent was evaporated and the films were dried. All of the films were optically transparent and showed a single $T_g$ as measured by DSC which was a function of composition.

EXAMPLE 3

MEEP/poly(styrene-co-vinylphenol) blends

Solution 1 was prepared by dissolving MEEP at a 5 wt % concentration in MEK. Solution 2 was prepared by dissolving poly(styrene-co-vinylphenol), a random copolymer consisting of 22 mol % vinylphenol, ($M_w = 96,000$ g/mol) at a 5 wt % concentration in MEK. Solutions 1 and 2 were mixed in varying proportions and were solution cast onto inert substrates. After drying, all films were optically transparent. Substantial hydrogen bonding was observed in these blends via the shift to lower wavenumbers of the PVPh unit hydroxyl IR band in the blends relative to that in the pure copolymer.

EXAMPLE 4

MEEP/poly(styrene-co-styrene-4-sulfonic acid) (SSA) blends

Solution 1 was prepared by dissolving MEEP at a 5 wt % concentration in MEK. Solution 2 was prepared by dissolving SSA, a random copolymer of styrene and styrene-4-sulfonic acid containing 12 mol % of the latter ($M_w = 241,000$ g/mol) at a 5 wt % concentration in MEK. Solutions 1 and 2 were mixed in varying proportions. Gels were obtained immediately upon mixing the two solutions indicating extremely strong interaction between the two polymers. The gels dried to optically clear films. For each of these blends, although two $T_g$ values were measured by DSC, each $T_g$ value was substantially shifted from that of the pure components, demonstrating substantial mixing of MEEP and SSA at the molecular level. Stable solutions and optically clear films were obtained when the polymers were blended as above, using pyridine as the solvent.

EXAMPLE 5

MEEP/poly(styrene-4-carboxylic acid) (SCA) blends

Solution 1 was prepared by dissolving MEEP at a 5 wt % concentration in THF. Solution 2 was prepared by dissolving SCA (100% carboxylic acid substituted) at a 5 wt % concentration in THF. Solutions 1 and 2 were mixed in varying proportions and cast onto inert substrates. After drying, all films were optically transparent.

EXAMPLE 6

MEEP/poly(butyl acrylate-coacrylic acid) blends

Solution 1 was prepared by dissolving MEEP at a 2.5 wt % concentration in a 1/1 mixture of THF/ethanol. Solution 2 was prepared by dissolving a random copolymer of 90 mol % butyl acrylate and 10 mol % of acrylic acid in THF/ethanol (1/1) at a 2.5 wt % concentration. Equal portions by weight of the two solutions were mixed and cast onto an inert substrate. After drying, an optically clear film was obtained which showed a single $T_g$ value intermediate between those of the pure components.

COMPARATIVE EXAMPLE 7

MEEP/Polystyrene Blends

Blends of MEEP with polystyrene prepared as described in Example 1 above resulted in white, non-transparent films and showed two $T_g$ values, unshifted from the $T_g$ values of the pure components.

COMPARATIVE EXAMPLE 8

PVPh blends with other polyphosphazenes

Solution 1 was prepared by dissolving PVPh at a 5 wt % concentration in THF. Solution 2 was prepared by dissolving poly[bis(phenoxy)phosphazene] at a 5 wt % concentration in THF. Solution 3 was prepared by dissolving poly[bis(trifluoroethoxy)phosphazene] at a 5 wt % concentration in THF. Blends prepared by mixing solutions 1 and 2, or mixing solution 1 and 3, resulted in phase separated materials which were opaque and showed two $T_g$ values at each composition which were not shifted from those of the pure components.

Comparative Examples 7 and 8 show that miscible blends were not formed when compounds other than those described as useful in the present invention were used.

The invention has been described in detail with particular reference to certain preferred embodiments thereof, but it will be understood that variations and modifications can be effected within the spirit and scope of the invention.

What is claimed is:

1. A miscible blend comprising
  a) an etheric polyphosphazene comprising recurring units represented by the structural formula:

wherein
  $R^1$ and $R^2$ each independently represents the formula $—(R^3—O)_n—R^4$ where n is 0 to 50 and n is 1 or more in at least half of the total substituents,
  $R^3$ is randomly alkyl having from 2 to 4 carbon atoms between oxygen atoms,
  $R^4$ is alkyl, alkylaryl, alkenyl, haloalkyl, aryl, substituted aromatic, aminoalkyl or thioalkyl,
  W and X each independently represents

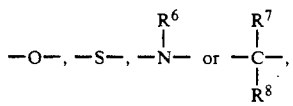

$R^6$, $R^7$ and $R^8$ each independently represents H, alkyl, alkenyl, alkynyl, haloalkyl, haloalkenyl, haloalkynyl, phenyl, substituted aromatic, aminoalkyl or thioalkyl, and
  b) a polymer made from a monomer or combination of monomers selected from the group consisting of acrylic acid, methacrylic acid, maleic acid, citriconic acid, 1-propene-1,2,3-tricarboxylic acid, a-chloroacrylic acid, fumaric acid, chlorofumaric acid, itaconic acid, vinylbenzoic acid, phenolic polymers (e.g., phenol formaldehyde resins), vinylphenol, N-(hydroxyphenyl)acrylamide, N-(hydroxyphenyl)methacryla-mide, hydroxyphenyl acrylate, hydroxyphenyl methacrylate, 3-sulfopropylmethacrylate, 2-acrylamido-2-methylpropane sulfonic acid, vinyl alcohol, vinyl chloride, 2-ethenylbenzenesulfonic acid, 4-ethenylbenzenesulfonic acid, 2-isopropenylbenzenesulfonic acid, 4-isopropenylbenzenesulfonic acid, α,α-bis(trifluoromethyl)-4-ethenylbenzenemethanol, and α,α-bis(trifluoromethyl)-4-isopropenylbenzenemethanol.

2. A miscible blend as in claim 1 wherein the polymer (b) comprises recurring units at least 5% of which are represented by the structural formula:

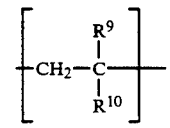

wherein
  $R^9$ represents H or $CH_3$ and
  $R^{10}$ represents $CO_2H$, $C_6H_4CO_2H$, $C_6H_4OH$, $C_6H_4SO_3H$, or $C_6H_4C(CF_3)_2OH$.

3. A miscible blend comprising poly(vinylphenol) and poly[bis(2-(2-methoxyethoxy)ethoxy)phosphazene].

4. A miscible blend comprising poly(vinylphenol) and poly[bis(methoxyethoxyethoxyethoxy)phosphazene].

5. A miscible blend comprising poly(styrene-co-vinylphenol) and poly[bis(2-(2-methoxyethoxy)ethoxy)phosphazene].

6. A miscible blend comprising poly(styrene-co-styrene-4-sulfonic acid) and poly[bis(2-(2-methoxyethoxy)ethoxy)phosphazene].

7. A miscible blend comprising poly(styrene-4-carboxylic acid) and poly[bis(2-(2-methoxyethoxy)ethoxy)phosphazene].

8. A miscible blend comprising poly(butyl acrylate-co-acrylic acid) and poly[bis(2-(2-methoxyethoxy)ethoxy)phosphazene].

* * * * *